June 17, 1947. F. E. JOHNSON 2,422,304
ROTARY OPERATIVE FASTENER AND INSTALLATION THEREFOR
Filed July 3, 1943 2 Sheets-Sheet 1

Inventor
Frank E. Johnson.
By Walter S. Jones
Attorney

June 17, 1947.  F. E. JOHNSON  2,422,304
ROTARY OPERATIVE FASTENER AND INSTALLATION THEREFOR
Filed July 3, 1943  2 Sheets-Sheet 2

Inventor
Frank E. Johnson.
By Walter S. Jones
Attorney

Patented June 17, 1947

2,422,304

UNITED STATES PATENT OFFICE 2,422,304

ROTARY OPERATIVE FASTENER AND INSTALLATION THEREFOR

Frank E. Johnson, Malden, Mass., assignor to United-Carr Fastener Corporation, Cambridge, Mass., a corporation of Massachusetts Application July 3, 1943, Serial No. 493,478

12 Claims. (Cl. 24—221)

1

The present invention relates to rotary operative fasteners and installations thereof and aims generally to improve the construction of the fastener as well as the installations in which they are used.

In fasteners of the rotary operative type used for detachably securing a plurality of sheets together, a rotary element, usually a stud member provided with suitable interlocking means such as radial arms or projections, is rotatably mounted in one of the parts to be fastened and is adapted to engage and interlock upon rotation with a female or complementary fastener member attached to the other part to be fastened.

Rotary operative fasteners of the type referred to are commonly used for detachably securing airplane cowling sheets to framework and the like. The development of modern aircraft, operating at very high speeds, subjects the parts to be fastened to high pressures, tending to separate the sheets and very accurate calibration of the fastener parts is required to secure an adequate fastening. Furthermore, the cowling sheets to be fastened are not uniformly of the same thickness, and are frequently distorted in use. To meet this condition it has been the practice of plane manufacturers to carry in stock a large number of different sized studs so that a proper selection of stud lengths can be made for each particular installation. This obviously slows down assembly and repair.

One of the objects of the present invention is to provide an improved rotary operative fastener which may be used as a cowling fastener to provide a quick secure fastening for cowling sheets that will withstand extremely high pressures tending to separate the sheets.

A further object of the invention is to provide a rotary operative fastener which may be used as a cowling fastener in which the rotary operative part and its cooperating socket part are permanently associated with the supporting part of the installation.

A further object of the invention is the provision of an improved fastener which may be made to a standard size and be adaptable to effectively secure together cowling sheets of varying thickness.

Other aims and advantages of the invention will be apparent to those skilled in the art from an inspection of the accompanying drawings and annexed specification illustrating and describing simple and preferred embodiments of the invention.

2

Figure 1:
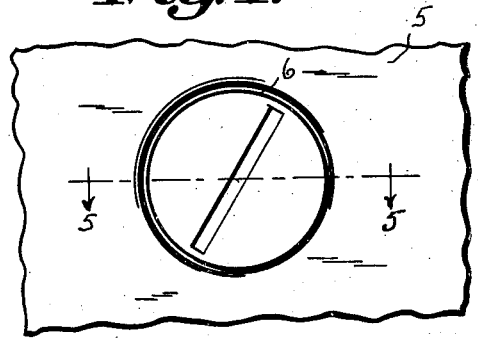
Fig. 1 is a plan view of a portion of an installation as viewed from the outer face of the part to be attached.
Figure 2:
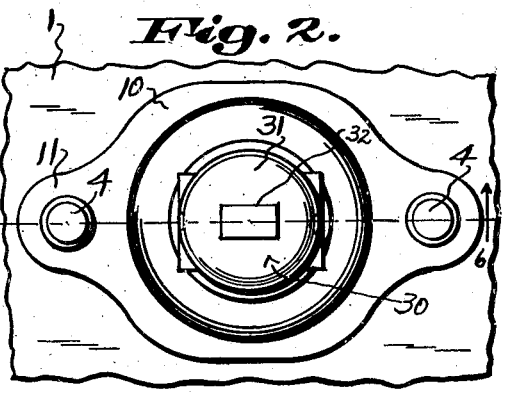
Fig. 2 is a plan view thereof as viewed from the inner face of the supporting part.
Figure 3:
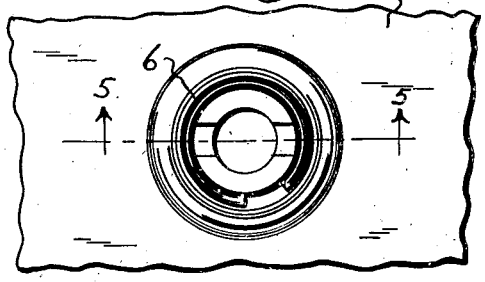
Fig. 3 is a plan view of a part of the installation as viewed from the inner face of the part to be attached shown in Fig. 1.
Figure 4:
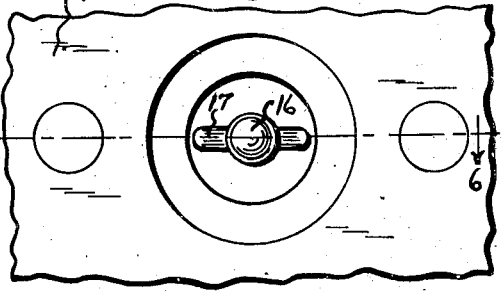
Fig. 4 is a plan view as viewed from the outer face of the supporting part shown in Fig. 2.
Figure 5:
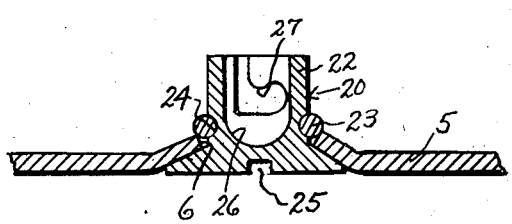
Fig. 5 is a sectional view of the part to be supported and its fastener part as taken on the lines 5—5 of Figs. 1 and 3.
Figure 6:
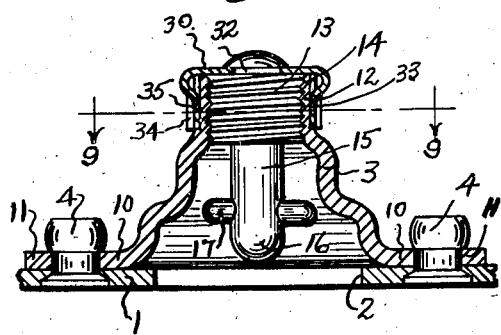
Fig. 6 is a sectional view of the supporting part and its fastener part as taken on the lines 6—6 of Figs. 2 and 4.
Figure 7:
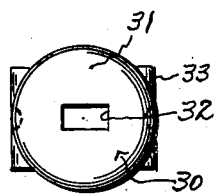
Figs. 7 and 8 are plan and side elevations respectively of one form of ratchet device which may be employed for holding the fastener parts in locked position.
Figure 8:
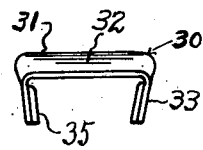
Figure 9:
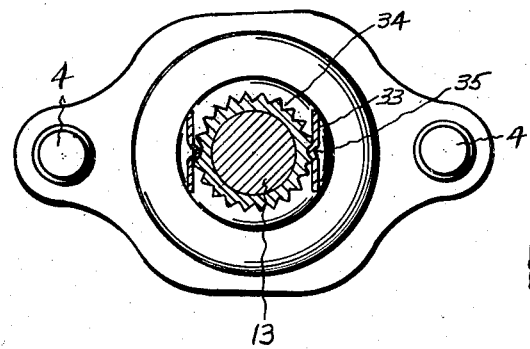
Fig. 9 is a horizontal sectional view as taken on the line 9—9 of Fig. 6.

According to the invention, the fastener is advantageously employed in installations comprising a supporting part 1 formed with an aperture 2 therein which conveniently may be one of the framing sheets of an aircraft or the like, though it will be understood that the invention is susceptible of other uses. A threaded nut member 3 is attached to the rear or inner face of the supporting part 1 in axial alignment with the aperture 2 by any suitable means, as, for example, rivets or like fastenings 4.

The part 5 to be supported against and attached to the supporting part 1 may be one of the cowling sheets of aircraft, and is formed with an aperture 6 in which is rotatably mounted one of the fastener parts adapted for interlocking engagement with another fastener part threadedly engaging said nut.

Referring to the illustrated embodiment shown in Figs. 1 to 10 inclusive of the drawings, the support 1 has secured to the inner or rear face thereof a nut member or device 3 which may advantageously be in the form of a sheet metal housing, having a substantially circular base 10 engaging the rear face of the support 1 around the aperture 2 thereof, and provided with radial elongations 11 to receive the fastening elements 4. The nut housing 3 may be attached to the support 1 in any suitable manner.

The nut member 3 preferably tapers outwardly from the base 10 to provide an internally threaded barrel 12 spaced rearwardly of the support 1 and in axial alignment with the aperture 2 thereof. Preferably the nut member 3 is provided with a continuous wall connecting the base 10 and barrel 12 which serves to protect the internal parts against damage by weather or other elements.

The devices for connecting and clamping the support 1 and the part 5 to be supported thereon together include separable elements rotatably mounted in the screw-threaded barrel 12 and part 5 to be supported with means for effecting an interlocking connection between the two, whereby they may be connected as the parts 1 and 5 are brought into assembled position, and simultaneously rotated by rotative force applied to the part mounted in the part 5 to be supported.

In the illustrated embodiment the connecting means comprises a screw member 13, the threads 14 of which engage the threaded bore of the barrel 12 so that the screw 13 is adjustable therein, and an extension 15 thereon comprising one part of a separable coupling 16. In the form of invention illustrated in Figs. 1 to 10 the extension 15 may be in the form of a cylindrical shank which may be integral with the screw 13 having transversely extending cross pin providing radial arms 17 and constituting one part of the separable coupling 16, as for example a pin and bayonet slot coupling.

The other part of the coupling advantageously comprises a member 20 rotatably mounted in the part 5 to be supported in the support 1, which member is complementary to the coupling member 16 so as to be detachably connected thereto.

Figure 10:
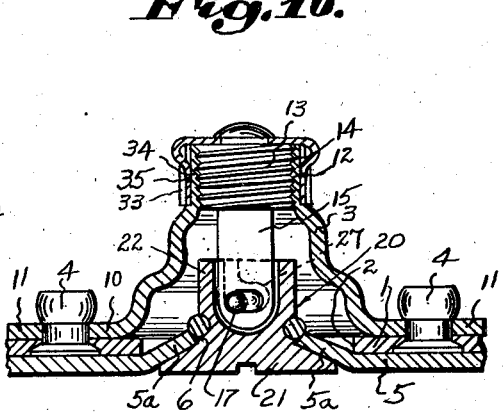
Fig. 10 is a vertical central sectional view of the installation.

In the illustrated embodiment shown in Fig. 10, the member 20 may be a headed part having an enlarged head 21 and a reduced shank 22 extending through the aperture 6 of the part 5 and rotatably retained therein by suitable means, as for example a spring wire split ring 23 snapped into a groove 24 in the shank. The outer end of the head may be formed with an elongated slot 25 for receiving a bladed tool for rotating the part 20. The shank 22 may be bored axially as at 26 to receive the nose end of the complementary coupling member 16 and opposed walls of the bored shank may be formed with oppositely arranged bayonet slots 27 having portions to receive the pin arms 17 upon relative axial movement of the complementary coupling parts 16 and 20, said bayonet slots having lateral extensions to interlock with said pin arms on rotation of the coupling part 20 relative to the part 16.

Thus it will be apparent that the separable parts 16 and 20 of the coupling may be readily connected by relative axial movement thereof in positioning the part 5 to be supported on the support 1 thereafter by slight relative rotation of the bayonet slotted socket and stud to bring the radial arms 17 thereof into locking engagement with the lateral extensions of the bayonet slot 27.

Continued rotation of the interlocked coupling parts 16 and 20 effects rotation of the screw 13 in the threaded barrel 12 in a tightening or clamping direction, and one or more complete turns thereof may be required to effect a tight clamping engagement between the parts 1 and 5, depending upon the thickness thereof and the initial position of the screw 13 in the nut barrel 12. Thus the parts 1 and 5 may be brought into rigid clamped relation under the highly efficient clamping action of a threaded screw or nut, irrespective of variations in the thickness of the parts 1 and 5. Even though the parts may be very tightly clamped under a high pressure as applied by a power tool, they may be quickly and easily unclamped by a partial rotation of the coupling member mounted in the part 5 sufficient to align the radial arms 17 of the stud with the axial elongation of the bayonet slot 27.

The invention preferably includes means for preventing accidental or unintentional rotation of one or both of the rotatable parts, such as the screw 13 and/or the member rotatably mounted in the part 5 to be supported. According to the illustrated embodiment the screw 13 may be prevented from unintentional rotation by suitable means, as for example a spring pawl 30 including a cap portion 31 non-rotatably attached as at 32 to the screw 13 and formed with depending spring fingers 33 adapted to bear under spring tension upon a serrated surface or ratchet 34 of the nut barrel 12. The serrations 34 may be formed in any suitable manner as by milling, and are engaged by a V-shaped blade 35 on the spring finger which acts as a pawl and ratchet device.

Obviously other forms of nut or screw locks may be employed without departing from the spirit of the invention.

Figure 11:
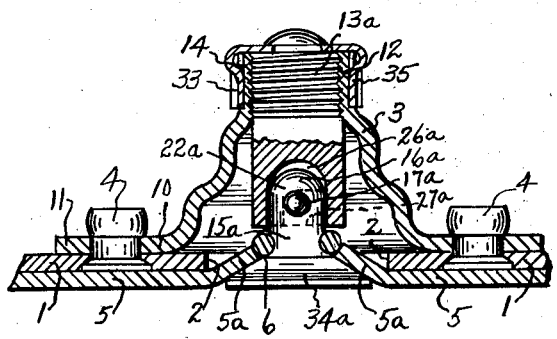
Fig. 11 is a similar view of a modified form of the invention.

It will be apparent to those skilled in the art that the invention is not restricted to the precise form of invention illustrated in Figs. 1 to 10 but is susceptible of considerable variation in constructional details. For example, as illustrated in Fig. 11, the member rotatable in the part 5 may be the stud or male member 22$^a$ having a shank portion 15$^a$, a nose 16$^a$ and radial arms 17$^a$, which is adapted to fit into a female member or recessed end 26$^a$ of the extension of the screw 13$^a$ and interlock upon relative rotation with the bayonet slot 27$^a$ in the sides thereof.

It will be apparent from the above description that the invention provides an improved rotating operative fastener, providing an efficient connecting fastener wherein the supporting part 1 has permanently associated therewith the rotary clamping part and the cooperating female fastener part, advantageously a nut and screw, which rotary part is adapted to be readily and detachably coupled and uncoupled with another part mounted in the part to be attached to the supporting part. The invention provides for quick and ready coupling and uncoupling of the parts subject to only a partial rotation of one of the coupling members, yet affords maximum clamping pressure by one or more complete rotations of the coupling member to securely fasten parts of varying thickness.

Although I have illustrated and described preferred forms of my invention, I do not wish to be limited thereby because the scope of my invention is best defined by the following claims.

I claim:

1. In a rotary operative fastener installation, in combination, a supporting sheet, a sheet detachably supported thereon, a rotary operative fastener for detachably connecting said sheets, said fastener including a nut and screw device attached to the rear face of said supporting sheet, and means rotatably mounted in the supported sheet and adapted to be detachably connected to the screw portion of said nut and screw device.

2. A rotary operative fastener comprising a fastener adapted to be attached to the rear face of a support and having a locking portion in rearward spaced relation thereto, a rotary fastener part adapted for locking engagement with said locking portion, a rotary member adapted to be mounted in a part to be supported, and interlocking coupling means on the adjoining ends of said rotary fastener part and member.

3. A rotary operative fastener adapted for connecting an apertured support and an apertured part to be attached thereto comprising a fastener part attachable to the rear face of a support and having a locking portion in rearward spaced relation thereto, a rotary fastener part adapted for locking engagement with said locking portion, a member adapted to be rotatably mounted in a part to be supported, the adjoining ends of said rotary fastener part and member formed with interlocking pin and slot coupling means.

4. A rotary operative fastener adapted for connecting an apertured support and an apertured part to be attached thereto, a nut member attachable to the support and having a threaded barrel spaced rearwardly thereof, a screw member rotatably threaded in said nut barrel, a member adapted to be rotatably mounted in said part to be supported, and cooperative interlocking coupling means on the adjoining ends of said screw and last named member for detachably connecting said parts together.

5. A rotary operative fastener for connecting an apertured support and an apertured part to be attached thereto, comprising a nut member attached to the support and having a threaded barrel spaced rearwardly thereof, a screw member rotatably threaded in said nut barrel, a member rotatably mounted in said part to be supported, and cooperative interlocking pin and slot coupling means on the adjoining ends of said screw and last named member for detachably connecting said parts together.

6. A rotary operative fastener adapted for connecting an apertured support and an apertured part to be attached thereto comprising a nut member having a threaded barrel portion in one portion thereof, a screw member mounted in said barrel in threaded engagement therewith and capable of at least one complete rotation therein, and a rotary member adapted to be detachably coupled with said screw member to effect rotation of said screw member and axial movement thereof in said nut according to the thickness of the support and part to be supported therein to clamp said parts together.

7. A rotary operative fastener adapted for connecting an apertured support and an apertured part to be attached thereto comprising a nut member having a support-engaging base and a threaded barrel portion spaced rearwardly thereof, a screw member mounted in said barrel in threaded engagement therewith and capable of at least one complete rotation therein, and a rotary member adapted to be detachably coupled with said screw member to effect rotation of said screw member and axial movement thereof in said nut according to the thickness of the support and part to be supported therein to clamp said parts together, said screw and rotary members being readily separable upon partial rotation of said member in an unfastening direction.

8. In a rotary operative fastener installation, in combination, a supporting part, a part to be detachably connected thereto, and means for detachably connecting said parts comprising a nut member attached to said supporting part in rearward spaced relation therewith, a screw member rotatably mounted in said nut in screw-threaded engagement therewith, and axially movable therein, a member rotatably mounted in said part to be supported, detachable coupling means between said member and screw whereby rotation of said member effects axial movement of said screw to clamp together said supporting part and part to be supported.

9. In a rotary operative fastener installation, in combination, a supporting part, a part to be detachably connected thereto, and means for detachably connecting said parts comprising a nut member attached to said supporting part in rearward spaced relation therewith, a screw member rotatably mounted in said nut in screw-threaded engagement therewith, and capable of one or more complete revolutions therein so as to be axially movable therein to accommodate parts of varying thickness, a member rotatably mounted in said part to be supported, detachable coupling means between said member and screw whereby rotation of said member effects axial movement of said screw to clamp together said supporting part and part to be supported.

10. In a rotary operative fastener installation, in combination, a supporting part, a part to be detachably connected thereto, and means for detachably connecting said parts comprising a nut member attached to said supporting part in rearward spaced relation therewith, a screw member rotatably mounted in said nut in screw-threaded engagement therewith, and capable of one or more complete revolutions therein so as to be axially movable therein to accommodate parts of varying thickness, a member rotatably mounted in said part to be supported, detachable coupling means between said member and screw whereby rotation of said member effects axial movement of said screw to clamp together said supporting part and part to be supported, and means for preventing accidental rotation of said rotary fastener parts.

11. In a rotary operative fastener installation, in combination, a supporting part, a part to be detachably connected thereto, and means for detachably connecting said parts comprising a nut member attached to said supporting part in rearward spaced relation therewith, a screw member rotatably mounted in said nut in screw-threaded engagement therewith, and capable of one or more complete revolutions therein so as to be axially movable therein to accommodate parts of varying thickness, a member rotatably mounted in said part to be supported, detachable coupling means between said member and screw whereby rotation of said member effects axial movement of said screw to clamp together said supporting part and part to be supported, and pawl and ratchet means for preventing accidental rotation of said rotary fastener parts.

12. In a rotary operative fastener installation, in combination, a supporting part, a part to be detachably connected thereto, and means for detachably connecting said parts comprising a nut member attached to said supporting part in rearwardly spaced relation therewith, a screw member rotatably mounted in said nut in screw-threaded engagement therewith, and capable of one or more complete revolutions therein so as to be axially movable therein to accommodate parts of varying thickness, a member rotatably mounted in said part to be supported, detachable coupling means between said member and screw whereby rotation of said member effects axial movement of said screw to clamp together said supporting part and part to be supported, and pawl and ratchet means between said nut and screw for resisting unintentional rotation of said screw in said nut.

FRANK E. JOHNSON.

REFERENCES CITED

The following references are of record in the file of this patent:

UNITED STATES PATENTS

| Number | Name | Date |
|---|---|---|
| 2,095,271 | Swanstrom | Oct. 12, 1937 |
| 1,768,505 | Carr | June 24, 1930 |
| 2,233,242 | Burke | Feb. 25, 1941 |
| 2,163,134 | Semion | June 20, 1939 |
| 2,329,909 | Johnson | Sept. 21, 1939 |
| 542,028 | Joynt | Dec. 23, 1941 |